UNITED STATES PATENT OFFICE.

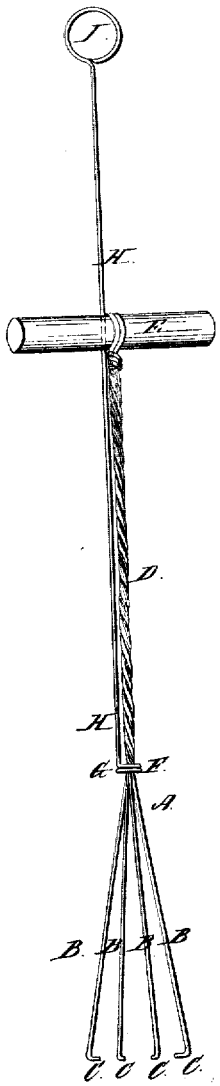

J. T. ASHLEY, OF BROOKLYN, E. D., NEW YORK.

IMPROVED INSTRUMENT FOR EXTRACTING CORKS FROM BOTTLES.

Specification forming part of Letters Patent No. 58,969, dated October 23, 1866.

*To all whom it may concern:*

Be it known that I, J. T. ASHLEY, of Brooklyn, E. D., in the county of Kings and State of New York, have invented a new and Improved Cork-Tongs; and I do hereby declare that the following is a full, clear, and exact description thereof, which will enable others skilled in the art to make and use the same, reference being had to the accompanying drawings, forming part of this specification.

The present invention relates to tongs, especially intended for the withdrawal or removal of corks from bottles, whether such corks are in the neck of the bottle or upon the inside of the same, and in the tongs embraced in this invention a slide is so arranged in connection with the several arms of the tongs that by properly sliding or moving such slide, the said arms can be made to close and tightly grasp the cork, so that by then pulling on the tongs the cork can be withdrawn with the utmost ease and facility from the neck of the bottle in which it may be placed, the said slide being also so combined with the tongs that the tongs can be closed upon and made to grasp a cork within a bottle and allow it to be withdrawn or removed therefrom through its neck.

In the accompanying plate of drawings my improved cork tongs are illustrated, the figure being a view of the same in the direction of its length.

A in the drawings represents the tongs, which in the present instance consist of four similar spring-arms, B, opened from each other or spread apart at their outer ends, C, but at their inner ends connected to one end of a common shaft or spindle, D, that at its other end is provided with a cross-bar or handle, E.

F is a slide placed upon the spindle D, which slide is in the form of a loop or ring, and is formed at one end, G, of a rod or wire, H, passing up through the handle E, and provided with a handle-ring, I, at its upper end, the said rod H being of a suitable length to allow the said slide F to be moved upon the spindle D over its arm B a sufficient distance to cause the said arms to be drawn inward, and thus brought together either more or less close, as the case may be.

In the use of my improved cork-tongs embraced in the present invention, the tongs, by the arms B at their open ends, are first placed over the cork, which is to be drawn out or removed from the neck of a bottle, when, moving the slide F in the proper direction, the said arms are made to close upon the cork and to tightly grasp it, (to insure which more perfectly they may be made of a hook shape at their ends and sharpened, as plainly shown in the drawings,) when, pulling upon the cork through the tongs thus made to grasp it, the cork can be removed or drawn with the utmost ease, facility, and dispatch, and with but little, if any, trouble or annoyance, the tongs, after the cork has been withdrawn with it, as explained, being then detached from the cork by moving the slide in the proper direction to allow the arms of the tongs to spring and open from each other.

From the above description of my improved cork-tongs it is plain to be seen that they are simple, cheap, effectual, and practical; that they can be used as readily upon a cork within a bottle as upon one which projects from its neck; and that, furthermore, they do not require the bottle to be upset or held with its mouth down while the cork is being withdrawn, as has always been the case with those heretofore in use.

I claim as new and desire to secure by Letters Patent—

The slide F, in combination with the tongs A, when arranged thereon so as to operate substantially in the manner and for the purpose described.

JOHN THOS. ASHLEY.

Witnesses:
ALBERT W. BROWN,
J. W. B. COVINGTON.